United States Patent [19]

Numrich, Jr.

[11] 4,064,386

[45] Dec. 20, 1977

[54] METHOD OF DECORATING WOOD AND WOOD-LIKE PRODUCTS

[76] Inventor: George R. Numrich, Jr., R.D. No. 3, Box 266, Kingston, N.Y. 12401

[21] Appl. No.: 681,899

[22] Filed: Apr. 30, 1976

[51] Int. Cl.[2] ........................... B23P 1/00; H05B 7/18; B27M 1/08; B29C 19/02

[52] U.S. Cl. ........................................ 219/68; 101/467; 144/309 R; 156/61; 156/272; 174/140 R; 219/383; 427/37; 428/15

[58] Field of Search ..................... 219/68, 69 R, 10.57, 219/6.5, 10.81, 70, 383, 384; 174/140 R, 137 R, DIG. 1; 428/15, 17, 151, 155; 427/37, 227, 257; 156/272, 61; 204/104; 52/741; 118/47; 34/1; 144/309 R, 309 A; 101/467; 346/335, 162, 163; 313/325

[56] References Cited

U.S. PATENT DOCUMENTS

| | | | |
|---|---|---|---|
| 1,007,513 | 10/1911 | Alcock | 34/1 |
| 1,146,212 | 3/1915 | Sullivan | 34/1 |
| 1,865,610 | 7/1932 | Blair | 346/335 |
| 2,113,714 | 4/1938 | Stein | 219/383 |
| 2,141,869 | 12/1938 | Konig | 219/384 |
| 2,408,434 | 10/1946 | Mann et al. | 34/1 |
| 2,997,528 | 8/1961 | Kessel et al. | 174/40 R |
| 3,369,919 | 2/1968 | Inglis | 427/227 |
| 3,986,268 | 10/1976 | Koppelman | 34/1 |

OTHER PUBLICATIONS

Gereview, "Nontracking Insulations Spur New Designs", Norman & Thompson, May-July, 1956, pp. 24-27.

*Primary Examiner*—Bruce A. Reynolds
*Attorney, Agent, or Firm*—Jacobs & Jacobs

[57] ABSTRACT

A surface of a wooden object is decorated by the formation of tracks in the surface simulating the random pattern of tracks seen in wormy wood, the tracks being formed by the application to the wood of a high voltage current.

10 Claims, 3 Drawing Figures

METHOD OF DECORATING WOOD AND WOOD-LIKE PRODUCTS

The present invention relates to a method of decorating wood or wood-like products, and more particularly to a method of creating "worm tracks" in a wooden surface.

So called "wormy wood", such as pecky cypress, is used for many ornamental purposes, ranging from wall panels to veneers for furniture. Such wood is highly prized for its worm tracks, which when naturally occurring are the result of the attack by worms on the tree from which the wood is obtained. Many artificial wormy woods are available, but these involve either expensive or time-consuming processes for creating the worm tracks in the wood or are obtained by laminating a photograph of a naturally occurring wormy wood between a support and a protective plastic face. The laminated materials are immediately identifiable as artificial, e.g. they have a smooth finish despite the appearance of the worm tracks and grain. The artificially created wormy woods are usually immediately identifiable because the worm tracks are not randomly created, as is the case in nature, but rather they have a "repeat", much the same as a wallpaper or textile fabric does. There is thus a need in the art for an economical, rapid process for creating worm tracks in wood and wood-like products that simulate the random pattern of worm tracks found in nature.

It is an object of the present invention to provide a process for creating a random pattern of grooves and channels in a wood or wood-like product that will closely simulate the random patten of worm tracks found in wormy wood.

It is another object of the invention to provide an economical and rapid process for creating the wormy wood effect in a wood or wood-like product.

These and other objects on invention are fulfilled by the provision of a method of decorating natural or synthetic wood, which comprises applying a high voltage current to at least one surface of the wood to initiate the burning of at least one track in said surface, and controlling the burning of the wood to obtain a random pattern of tracks.

The application of a gaseous electrical discharge to or through a surface has long been known to have a wide variety of purposes. Generally speaking, the vast majority of these treatments is intended to modify the molecules, or perhaps even atoms, in the surface layer of the object being treated, for example to form free radicals therein, thus enabling a wide variety of after-treatments, while leaving the material otherwise unchanged. Any burning or visible change in the material from such treatment is normally considered highly undesirable and hence has been avoided. Other of the prior art relates to a controlled perforation of the material, such as referred to in U.S. Pat. Nos. 2,141,869 and 3,622,751, both of which perforate a sheet, web or cloth-like substance by passing a plurality of sparks through the material. So far as I am aware, however, there has been no proposal in the prior art to form gross, visible destruction of the surface of the material by means of an electrical discharge. The essence of the invention is the discovery that a high voltage current can be used to create large random tracking in a wooden material, which would be anathema to the prior art but is the desideratum of the present invention.

The present invention is illustrated by the accompanying drawing, in which.

Figure 1:
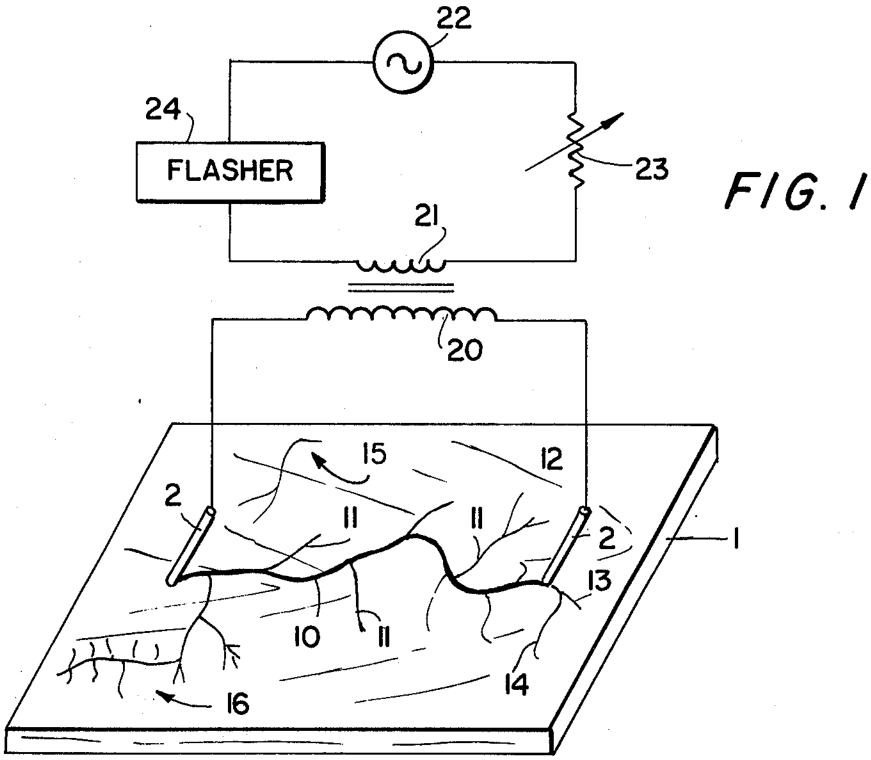
FIG. 1 is a schematic illustration of apparatus used to form worm tracks in a wooden material according to the present invention.

Referring to FIG. 1, a wooden board 1 is treated according to the invention by means of placing a pair of electrodes 2,2 in the wood, such as by driving common nails partially into the wooden board 1. Each electrode 2,2 is connected to one lead of the secondary coil 20 of a transformer, and the primary coil 21 of the transformer is connected in series with a source of current 22, a variable resistor 23 and a flashing device 24. As shown, the source of current 22 is a source of 110 volt, 60 Hz alternating current, such as ordinary household current. The coils 20 and 21 are so arranged as to provide a voltage drop between the electrodes 2,2 of approximately 10,000 volts, e.g. at least about 6,000 volts, such as from about 6,000 to about 25,000 volts or more.

After the appropriate electrical connections have been made, the current is caused to flow through the primary coil 21 so that the high voltage of 10,000 volts is applied between electrodes 2,2. A track 10 will begin to form from one or the other of the electrodes 2,2 and proceed toward the other electrode. As the main track proceeds along the surface of the wooden block 1, a plurality of branches 11 are formed at random, and some of these branches 11 form secondary branches 12, also at random. When the main track 10 spans the two electrodes 2,2, often a subsidiary track 13 will be formed extending beyond an electrode 2, and many times the subsidiary track 13 will itself have a further branch 14.

At any time during the formation of the tracks 10 through 14, a secondary track 15 may appear, remote from the electrodes 2,2 and remote from the tracks 10–14. There may be one or more of these remote tracks 15 or none, depending upon the nature of the wood. The appearance of these remote tracks is quite unpredictable.

Once the main track 10 has started to appear, and is proceeding at a fairly consistent pace, the initial high voltage of 10,000 volts is not required to maintain the progress of the track 10 from one electrode 2 to the other. Hence, the resistance in the circuit containing the primary coil 21 can be adjusted through the variable resistor 23 to reduce the voltage across the primary coil 21 and hence across the electrodes 2,2. A convenient operating voltage has been found to be about 6,000 volts, but a lower or higher voltage can be used, such as about 1,000 to about 10,000 volts. The variable resistor can also be used to obtain the fine, "crow's-feet" pattern 16. Thus, once the voltage has been reduced to about 6,000 volts, the variable resistor can be used to control the type of pattern obtained in the branches 11 so that the branches 11 can have the crow's-feet pattern 16. This is accomplished by increasing the resistance of the variable resistor 23 so that the amperage is reduced, and hence there is a more delicate tracking obtained to give the patten 16 rather than the branch and twig pattern 10,11 or 10,11,12.

The flasher 24 is any conventional device that is capable of periodically interrupting the flow of current through the circuit. In its simplest form, the flasher 24 can simply be a toggle switch that is manipulated mechanically. In a more refined embodiment, the flasher 24 can be any standard flasher, such as used for decorative flashing light arrangements. The flasher 24 is activated when the rate of travel of the main track 12 appears to be slowing down or otherwise proceeding in an esthetically uninteresting way. Activation of the flasher 24 creates a pulse-like application of the high voltage current and causes the rate of formation of the track 10 to increase. Clearly, while desirable, the variable resistor 23 and the flasher 24 are not essential elements of the present invention.

The formation of the tracks 10 through 16 is accompanied by a burning and charring of the wood. No electrical spark is observed between the electrodes 2,2. The use of higher voltages gives rise to deeper, undercut tracks while the use of lower voltages gives rise to shallower, less undercut tracks. Likewise, the longer the time of treatment, the deeper and more undercut the tracks become.

The wood itself needs no special pre-treatment prior to its being used in the method of the present invention. Depending on the age of the wood, its moisture content, its sap content, and perhaps other unknown factors, the various parameters of operation will be adjusted slightly differently from piece to piece. For particularly dry woods, it is preferred to slightly dampen the surface of the wood to be treated prior to application of the high voltage current. Similarly, during the treatment, if the rate of progress of the track 10 is too slow, the surface of the wood can be slightly dampened, such as by application of water through an aerosol sprayer. Here again, there does not appear to be any criticality in the amount of water or the manner in which the water is applied.

For a given piece of wood, the initial voltage, the operating voltage, the spacing between the electrodes 2,2 and the other parameters of operation described above will be empirically determined to give the effect desired. The operating parameters are controlled in relation to the thickness of the wooden object to be treated to avoid uncontrolled burning of the wood caused by too deep and/or too rapid or too vigorous burning. Since the effect itself is esthetic, and hence subjective, and since the pattern of the tracks 10–16 is random, and hence unpredictable, it is not possible to lay down a detailed schedule of operation, but rather experience with a particular kind of wood will determine the conditions to be used for that wood.

Figure 2:
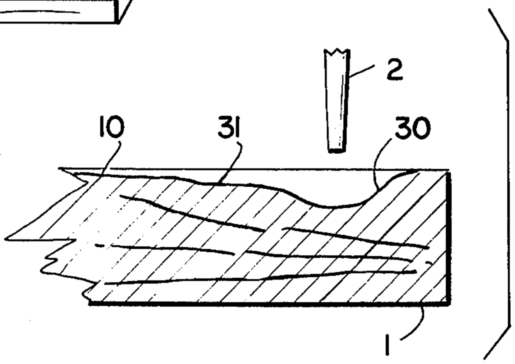
FIG. 2 is an enlarged detail view, in section, of another embodiment of the invention.

FIG. 2 illustrates an alternative embodiment of the invention in which an electrode 2 is raised from the surface of the block 1. Immediately below the electrode 2, a generally hemispherical cavity 30 will be formed. Cavity 30 is generally joined to the track 10 by means of a trough 31 that is of intermediate depth between track 10 and cavity 30. One or both of the electrodes 2,2 can be raised above the surface of the wood. When the embodiment shown for FIG. 2 is employed, an electrical spark discharge will be seen leading from each raised electrode 2 to the surface of the wooden block 1.

Figure 3:
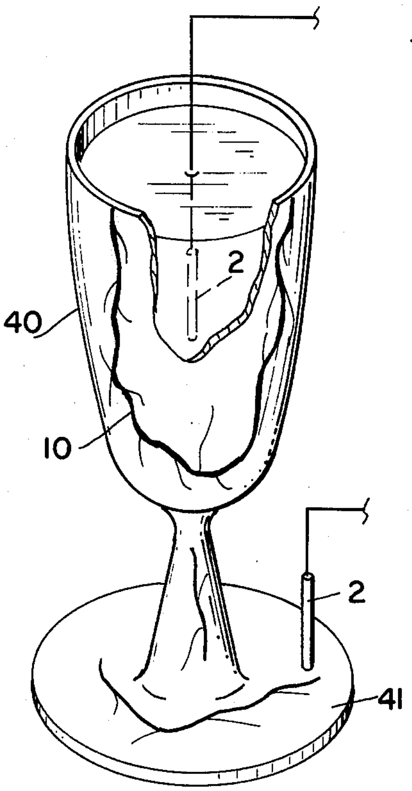
FIG. 3 is a schematic view of another embodiment of the invention.

FIG. 3 shows a further embodiment of the invention in which the method is used to decorate the surface of a wooden vase 40. In order to avoid formation of tracks on the inside of the vase, the vase is filled with water and one electrode 2 is suspended in the water while the other electrode 2 is attached to the vase 40, such as in the pedestal 41. The leads from the electrodes 2,2 are connected to the secondary coil 20 as in FIG. 1. Application of the high voltage between electrodes 2,2 creates the tracks 10 on the outer surface of the vase. If it is desired to form tracks on two sides of a wooden object, one electrode 2 can be embedded in or spaced from one side while the other electrode 2 is embedded in or spaced from the other side. In this embodiment, the tracks 10 through 16 observed in FIG. 1 will likewise be observed on both sides of the wooden object.

The present invention is preferably applied to the treatment of natural wood either in the unfinished or raw form of sheets, boards, veneers, and the like or in the form of finished articles, such as furniture, wood carvings and the like, However, synthetic wood may also be treated, such as plywood and the various forms of wood-like sheets made from wood particles or fiber, such as chip board and particle board. Both natural and synthetic wood result in the random pattern of tracks when treated according to the invention.

The present invention has been described above in terms of preferred embodiments and it is to be understood that various modifications may be made within the scope of the appended claims. For example, a non-aqueous conductive liquid can be used in place of water. Further, the tracks can be made to simulate wood that has been attacked by wood-eating pests other than worms, or indeed the tracks can be purely abstract.

What is claimed is:

1. A method of decorating wood, which comprises providing a pair of electrodes in proximity to a surface of the wood, applying a high voltage current of from about 6,000 to about 25,000 volts to said surface of the wood across said electrodes to initiate the burning of at least one track in said surface, reducing the voltage across said electrodes after the initiation of the burning of said track to a value no lower than about 1,000 volts and controlling the burning of the wood to obtain a random pattern of tracks.

2. The method according to claim 1, in which said surface is dampened with water prior to application of said high voltage current.

3. The method according to claim 1, in which said surface is dampened with water after the initiation of said burning.

4. The method according to claim 1, in which at least one of said electrodes directly contacts said surface.

5. The method according to claim 1, in which said pair of electrodes directly contacts said surface.

6. The method according to claim 1, in which said high voltage current has a voltage of about 10,000 volts at the initiation of said burning, and the voltage of said high voltage current is then reduced to a value of about 6,000 volts.

7. The method according to claim 1, in which the high voltage current is reduced to form at least a portion of the track with a substantially reduced depth.

8. The method according to claim 1, wherein the high voltage current is applied to said surface during a fraction of the total time of treatment in pulse form.

9. The method according to claim 1, in which said surface is a curved surface.

10. The method according to claim 1, in which said wood is selected from the group consisting of natural woods and synthetic woods.

* * * * *